US012683829B2

(12) United States Patent
Yun et al.

(10) Patent No.: US 12,683,829 B2
(45) Date of Patent: Jul. 14, 2026

(54) APPARATUS FOR CONTROLLING A GCL OF AN ETHERNET SWITCH AND A METHOD THEREOF

(71) Applicants: Hyundai Motor Company, Seoul (KR); Kia Corporation, Seoul (KR); Industry-University Cooperation Foundation Korea Aerospace University, Goyang-si (KR)

(72) Inventors: Jin Hwa Yun, Seoul (KR); Ju Ho Choi, Seoul (KR); Dong Jun Lee, Goyang-si (KR)

(73) Assignees: Hyundai Motor Company, Seoul (KR); Kia Corporation, Seoul (KR); Industry-University Cooperation Foundation Korea Aerospace University, Goyang-si (KR)

( * ) Notice: Subject to any disclaimer, the term of this patent is extended or adjusted under 35 U.S.C. 154(b) by 268 days.

(21) Appl. No.: 18/521,229

(22) Filed: Nov. 28, 2023

(65) Prior Publication Data

US 2025/0055724 A1     Feb. 13, 2025

(30) Foreign Application Priority Data

Aug. 8, 2023     (KR) ......................... 10-2023-0103583

(51) Int. Cl.
H04L 12/40 (2006.01)

(52) U.S. Cl.
CPC .................. H04L 12/40006 (2013.01); H04L 2012/40215 (2013.01); H04L 2012/40273 (2013.01)

(58) Field of Classification Search
CPC ..... H04L 12/40006; H04L 2012/40215; H04L 2012/40273; H04L 12/4015; H04L 12/40071; H04L 12/40058; H04L 69/08
See application file for complete search history.

(56) References Cited

U.S. PATENT DOCUMENTS

| | | | | |
|---|---|---|---|---|
| 10,681,128 | B2 * | 6/2020 | Wetterwald | H04L 67/1095 |
| 10,757,228 | B1 * | 8/2020 | Bhimavarapu | H04L 69/08 |
| 11,388,060 | B1 * | 7/2022 | Subramanian | H04L 41/0803 |
| 2014/0023068 | A1 * | 1/2014 | Kim | H04L 12/40006 |
| | | | | 370/355 |
| 2014/0126584 | A1 * | 5/2014 | Hwang | H04L 12/413 |
| | | | | 370/466 |
| 2015/0229741 | A1 * | 8/2015 | Kim | H04L 69/08 |
| | | | | 370/467 |
| 2016/0182394 | A1 * | 6/2016 | Kiessling | G05B 19/4185 |
| | | | | 370/230 |

(Continued)

FOREIGN PATENT DOCUMENTS

EP          2690827 B1 *  4/2016   ....... H04L 12/40163

*Primary Examiner* — Ayaz R Sheikh
*Assistant Examiner* — Tarell A Hampton
(74) *Attorney, Agent, or Firm* — Banner & Witcoff, Ltd.

(57) ABSTRACT

An apparatus for controlling a GCL of an Ethernet switch and a method thereof are provided. A controller area network (CAN) message is transformed to an Ethernet frame, a queue corresponding to a transmission type of the CAN message is determined, and a time to open or close a transmission gate of the queue is updated over a gate control list (GCL), thereby effectively scheduling (lowering the complexity of scheduling) a plurality of CAN messages transmitted to the Ethernet, and improving transmission reliability of the CAN message.

20 Claims, 9 Drawing Sheets

(56)     References Cited

U.S. PATENT DOCUMENTS

| | | | |
|---|---|---|---|
| 2017/0072876 A1* | 3/2017 | Rajan | H04L 12/66 |
| 2018/0032094 A1* | 2/2018 | Zhang | G05B 19/054 |
| 2019/0132424 A1* | 5/2019 | Jeong | H04L 67/12 |
| 2019/0370220 A1* | 12/2019 | Tsutsumi | G06F 15/78 |
| 2020/0036554 A1* | 1/2020 | Iwata | H04L 41/0668 |
| 2020/0145433 A1* | 5/2020 | Gutierrez | G06N 3/0985 |
| 2020/0220888 A1* | 7/2020 | Terazawa | B60T 17/221 |
| 2020/0259896 A1* | 8/2020 | Sachs | H04L 67/12 |
| 2020/0304429 A1* | 9/2020 | Marcé | H04L 47/28 |
| 2020/0366529 A1* | 11/2020 | Park | H04L 69/22 |
| 2021/0007160 A1* | 1/2021 | Sivasiva Ganesan | H04W 8/005 |
| 2021/0029103 A1* | 1/2021 | Mizukoshi | H04L 63/18 |
| 2021/0067927 A1* | 3/2021 | Mizukoshi | H04W 4/48 |
| 2021/0144666 A1* | 5/2021 | Sivasiva Ganesan | H04W 56/0015 |
| 2021/0204172 A1* | 7/2021 | Rost | H04L 43/026 |
| 2021/0243771 A1* | 8/2021 | Mannweiler | H04W 24/02 |
| 2021/0266244 A1* | 8/2021 | Haga | G06F 21/554 |
| 2021/0306901 A1* | 9/2021 | Mannweiler | H04L 12/4633 |
| 2021/0325868 A1* | 10/2021 | Allgaier | H04L 12/40 |
| 2021/0400524 A1* | 12/2021 | Kahn | H04L 65/80 |
| 2022/0014485 A1* | 1/2022 | Pocovi | H04L 1/1838 |
| 2022/0094588 A1* | 3/2022 | Åkerberg | H04L 47/15 |
| 2022/0368641 A1* | 11/2022 | Chao | H04L 47/24 |
| 2025/0039255 A1* | 1/2025 | Jeon | H04L 65/65 |
| 2025/0203601 A1* | 6/2025 | Bush | H04W 56/002 |

* cited by examiner

| | Source, Destination | Priority | Size (bytes) | Period (ms) |
|---|---|---|---|---|
| ST1 | ECU1, ECU3 | 6 | 125 | 50ms |
| ST2 | ECU1, ECU4 | 4 | 250 | 100ms |
| ST3 | ECU2, ECU3 | 7 | 125 | 100ms |
| ST4 | ECU2, ECU1 | 4 | 250 | 100ms |
| ST5 | ECU5, ECU1 | 5 | 250 | 50ms |

FIG.6

APPARATUS FOR CONTROLLING A GCL OF AN ETHERNET SWITCH AND A METHOD THEREOF

CROSS-REFERENCE TO RELATED APPLICATION

This application claims the benefit of priority to Korean Patent Application No. 10-2023-0103583, filed in the Korean Intellectual Property Office on Aug. 8, 2023, the entire contents of which are incorporated herein by reference.

TECHNICAL FIELD

The present disclosure relates to a technology of controlling (for example, generating or updating) a gate control list (GCL) of an Ethernet switch under a heterogeneous communication network environment (or system).

BACKGROUND

In general, a vehicle network may include various hetero communication networks, such as Controller Area Network (CAN), Controller Area Network with Flexible Data-rate (CAN FD), Local Interconnect Network (LIN), FlexRay, Media Oriented Systems Transport (MOST), or Ethernet.

A CAN communication protocol may provide an effective serial communication protocol having a higher security level, and support real-time control. Such CAN has advantages of supporting multiple masters, processing priority, or finely detecting errors. In addition, CAN supports various speeds and minimizes an influence exerted by a specific node defective even if the specific node is defective.

LIN communication is slower than CAN communication in terms of data rate, but supports a simpler structure. Accordingly, the LIN communication is suitable for an environment only including a sensor and an actuator without a controller.

A vehicle may be equipped with various electronic devices, and the real-time transmission of data, that is, determinism has to be ensured between ECUs (electronic control units) provided in the electronic devices. However, the CAN communication has a limitation in ensuring the real-time transmission of data, that is, determinism. Accordingly, there has been suggested MOST communication showing higher rapidity and reliability.

The CAN communication scheme is a competitive communication scheme based on collision sensing, and the FLEXRAY communication scheme is a communication scheme based on time-division to support deterministic data and non-deterministic data. Such a FLEXRAY communication scheme is to divide one slot period into a static segment, a dynamic segment, a symbol window, and a network idle time, such that a bandwidth is utilized as much as possible with a fixed time slot. In this case, the static segment is a segment in which deterministic data is allocated, the dynamic segment is a segment in which non-deterministic data is allocated, the symbol window is a segment for maintaining a network, and for starting signaling, and the network idle time is a segment for synchronization.

Such a FLEXRAY communication scheme may correspond to a lower data rate application and a higher data rate application and may provide an error-resistant transmission characteristic and scalability. In addition, according to the FLEXRAY communication scheme, the nodes synchronize with each other, and make communication with each other in cooperation with each other, instead that a specific master node controls the entire network. Each node synchronizes the local clock of each node to one common global clock based on idle time.

Meanwhile, a vehicle Ethernet communication scheme is a representative one of competitive communication schemes to provide a higher network speed while ensuring sufficient reliability and a deterministic property. Most of all, the vehicle Ethernet communication scheme has been spotlighted due to easy scalability.

Numerous part manufacturers and automakers have been involved in developing a vehicle, and each automaker appropriately employs solutions provided by the part manufacturer.

Accordingly, electronic parts connected to each other through mutually different network protocols are mixed in the vehicle. Accordingly, the development of a gateway allowing smooth communication between heterogeneous communication networks is strongly required. For example, to transmit a message from the CAN to the Ethernet, the development of a technology of time-synchronization between the CAN and the Ethernet, a technology of transforming the Can message in the form of an Ethernet message, and a technology of effectively transmitting an Ethernet message from an Ethernet switch is strongly required.

The matter described in "Background" is made for the convenience of explanation, and may include matters other than a related art well known to those skilled in the art.

SUMMARY

The following summary presents a simplified summary of certain features. The summary is not an extensive overview and is not intended to identify key or critical elements.

An aspect of the present disclosure provides an apparatus for controlling a GCL of an Ethernet switch, capable of transforming a controller area network (CAN) message to an Ethernet frame, of determining a queue corresponding to a transmission type of the CAN message, and of updating a time to open or close a transmission gate of the queue over a gate control list (GCL), thereby effectively scheduling (lowering the complexity of scheduling) a plurality of CAN messages transmitted to the Ethernet, and improving transmission reliability of the CAN message, and a method thereof.

Another aspect of the present disclosure provides an apparatus for controlling a GCL of an Ethernet switch, capable of receiving a CAN message from an ECU over the CAN, determining whether the CAN message is routed to the Ethernet based on a routing DB, controlling a GCL of an Ethernet switch, transforming a CAN message to an Ethernet frame, of determining a queue corresponding to a transmission type of the CAN message, and of updating a time to open or close a transmission gate of the queue over a gate control list (GCL), thereby effectively scheduling (lowering the complexity of scheduling) a plurality of CAN messages transmitted to the Ethernet, and improving transmission reliability of the CAN message, and a method thereof.

Another aspect of the present disclosure provides an apparatus for controlling a GCL of an Ethernet switch, capable of receiving a CAN message from an ECU over the CAN, determining whether the CAN message is routed to the Ethernet, transforming the CAN message to the Ethernet frame when the CAN message is routed to the Ethernet, dividing a plurality of queues provided in an Ethernet switch into a first queue (for example, a queue used to transmit a first Ethernet frame corresponding to the aperiodic CAN message) and a second queue (for example, a queue used to transmit a second Ethernet frame corresponding to the CAN message), updating the time to open or close the transmission gate of the first queue over the GCL, when the transmission type of the CAN message is an aperiodic transmission type, and updating the time to open or close the transmission gate of the second queue over the GCL, when the transmission type of the CAN message is the periodic transmission type, thereby effectively scheduling (lowering the complexity of scheduling) a plurality of CAN messages transmitted to the Ethernet, and improving transmission reliability of the CAN message, and a method thereof.

The technical problems to be solved by the present disclosure are not limited to the aforementioned problems, and any other technical problems not mentioned herein will be clearly understood from the following description by those skilled in the art to which the present disclosure pertains.

An apparatus may comprise: a storage configured to store a gate control list (GCL) associated with an Ethernet switch; and a controller configured to: transform a controller area network (CAN) message to an Ethernet frame; determine a queue corresponding to a transmission type of the CAN message; and update, in the GCL, a time to open or close a transmission gate of the queue.

The queue may comprise: a first queue configured to transmit a first Ethernet frame corresponding to an aperiodic CAN message; and a second queue configured to transmit a second Ethernet frame corresponding to a periodic CAN message.

The controller may be configured to update the time to open or close the transmission gate of the queue by: based on the transmission type of the CAN message being an aperiodic transmission type, updating, in the GCL, a time to open or close a transmission gate of the first queue; or based on the transmission type of the CAN message being a periodic transmission type, updating, in the GCL, a time to open or close a transmission gate of the second queue.

The controller may be configured to: based on a quantity of consecutive reception failures of the CAN message having the periodic transmission type being greater than a configured threshold value, reset, in the GCL, the time to open or close the transmission gate of the second queue.

The controller may be configured to: perform time-synchronization between a CAN and an Ethernet.

The controller may be configured to: transform a plurality of CAN messages having a same period to one Ethernet frame.

The controller may be configured to: based on a first CAN message of a plurality of CAN messages for a same Ethernet frame having a higher priority than a second CAN message of the plurality of CAN messages, update the GCL such that the first CAN message is transmitted prior to transmission of the second CAN message.

The controller may be configured to: determine whether to route the CAN message through an Ethernet.

The apparatus may further comprise: a receiving device configured to receive the CAN message from an electronic control unit (ECU) associated with a CAN.

The Ethernet switch may be configured to: transmit, based on the GCL, the Ethernet frame.

A method may comprise: storing, in a storage, a gate control list (GCL) associated with an Ethernet switch; transforming, by a controller, a controller area network (CAN) message to an Ethernet frame; determining, by the controller, a queue corresponding to a transmission type of the CAN message; and updating, by the controller and in the GCL, a time to open or close a transmission gate of the queue.

The queue may comprise: a first queue configured to transmit a first Ethernet frame corresponding to an aperiodic CAN message; and a second queue configured to transmit a second Ethernet frame corresponding to a periodic CAN message.

The updating may comprise: based on the transmission type of the CAN message being an aperiodic transmission type, updating, in the GCL, a time to open or close a transmission gate of the first queue; or based on the transmission type of the CAN message being a periodic transmission type, updating, in the GCL, a time to open or close a transmission gate of the second queue.

The updating may comprise: based on a quantity of consecutive reception failures of the CAN message having the periodic transmission type being greater than a configured threshold value, resetting, in the GCL, the time to open or close the transmission gate of the second queue.

The method may further comprise: prior to the transforming, performing, by the controller, time-synchronization between a CAN and an Ethernet.

The transforming may comprise: transforming a plurality of CAN messages having a same period to one Ethernet frame.

The updating may comprise: based on a first CAN message of a plurality of CAN messages for a same Ethernet frame having a higher priority than a second CAN message of the plurality of CAN messages, updating, by the controller, the GCL such that the first CAN message is transmitted prior to transmission of the second CAN message.

The method may further comprise: prior to the transforming, determining, by the controller, whether to route the CAN message to an Ethernet.

The method may further comprise: prior to the transforming, receiving, by a receiving device, the CAN message from an electronic control unit (ECU) associated with a CAN.

The method may further comprise: after the updating, transmitting, by the Ethernet switch and based on the GCL, the Ethernet frame.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 6 is a view illustrating the GCL generated by an apparatus for controlling the GCL of the Ethernet switch;

DETAILED DESCRIPTION

Figure 1:
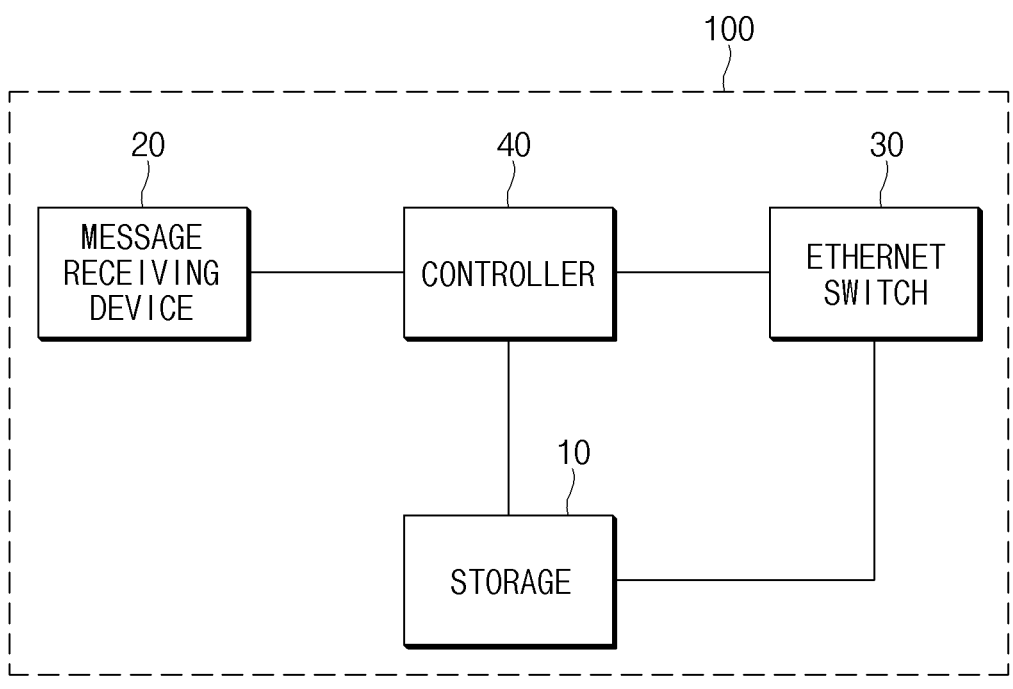
FIG. 1 is a view illustrating the structure of an apparatus for controlling a GCL of an Ethernet switch.

Hereinafter, various examples of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of one or more aspects of the present disclosure, a detailed description of well-known features or functions will be ruled out in order not to unnecessarily obscure the gist of the present disclosure.

In describing the components of the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

FIG. 1 is a view illustrating the structure of an apparatus (hereinafter, a GCL control apparatus 100) for controlling a GCL of an Ethernet switch. But aspects are not limited to Ethernet and/or the Ethernet switch, and other types of communication protocol and switches may be used. Such GCL control apparatus 100 may be implemented in the form of a vehicle gate, but aspects of the present disclosure are not limited thereto.

As illustrated in FIG. 1, the GCL control apparatus 100 may include a storage 10, a message receiving device 20, an Ethernet switch 30, and a controller 40. In this case, the components may be combined into each other to be implemented in one form, or some components may be omitted, depending on the manners of reproducing the GCL control apparatus 100 of the Ethernet switch. The following description will be made while focusing on a CAN message, but any one of a LIN message, a FLEXRAY message, or a MOST message.

Regarding each component, the storage 10 may store various logics, various algorithms, and various programs for the process of transforming a CAN message to an Ethernet frame, of determining a queue corresponding to the transmission type of the CAN message, and updating the time to open or close the transmission gate of the queue on the GCL.

The storage 10 may store various logics, various algorithms, and various programs for the process of receiving a CAN message from an ECU over the CAN through the message receiving device 20, determining whether to route the CAN message to the Ethernet, based on a routing database (DB), of transforming the CAN message to the Ethernet frame, when the CAN message is routed to the Ethernet, of determining queue corresponding to the transmission type of the CAN message, and of updating the time to open or close the transmission gate of the queue over the GCL. In this case, the routing DB stores information on the CAN message to be transmitted to the Ethernet set by a designer, routing information of the CAN message, and path information of the CAN message.

The storage 10 may store various logics, various algorithms, and various programs required in the process of receiving a CAN message from an ECU over the CAN through the message receiving device 20, of determining whether the CAN message is routed to the Ethernet, transforming the CAN message to the Ethernet frame when the CAN message is routed to the Ethernet, dividing a plurality of queues provided in the Ethernet switch 30 into a first queue and a second queue, updating the time to open or close the transmission gate of the first queue over the GCL, when the transmission type of the CAN message is an aperiodic transmission type, and of updating the time to open or close the transmission gate of the second queue over the GCL, when the transmission type of the CAN message is the periodic transmission type.

The storage 10 may store a GCL updated (e.g., in real time) by the controller 40.

The storage 10 may include at least one storage medium of a memory in a flash memory type, a hard disk type, a micro type, the type of a card (e.g., a Security Digital (SD) card or an extreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The message receiving device 20, which may include a module to provide a communication interface with CAN, may receive a CAN message from each ECU over CAN. The message receiving device 20 may have the structure as illustrated in FIG. 2.

Figure 2:
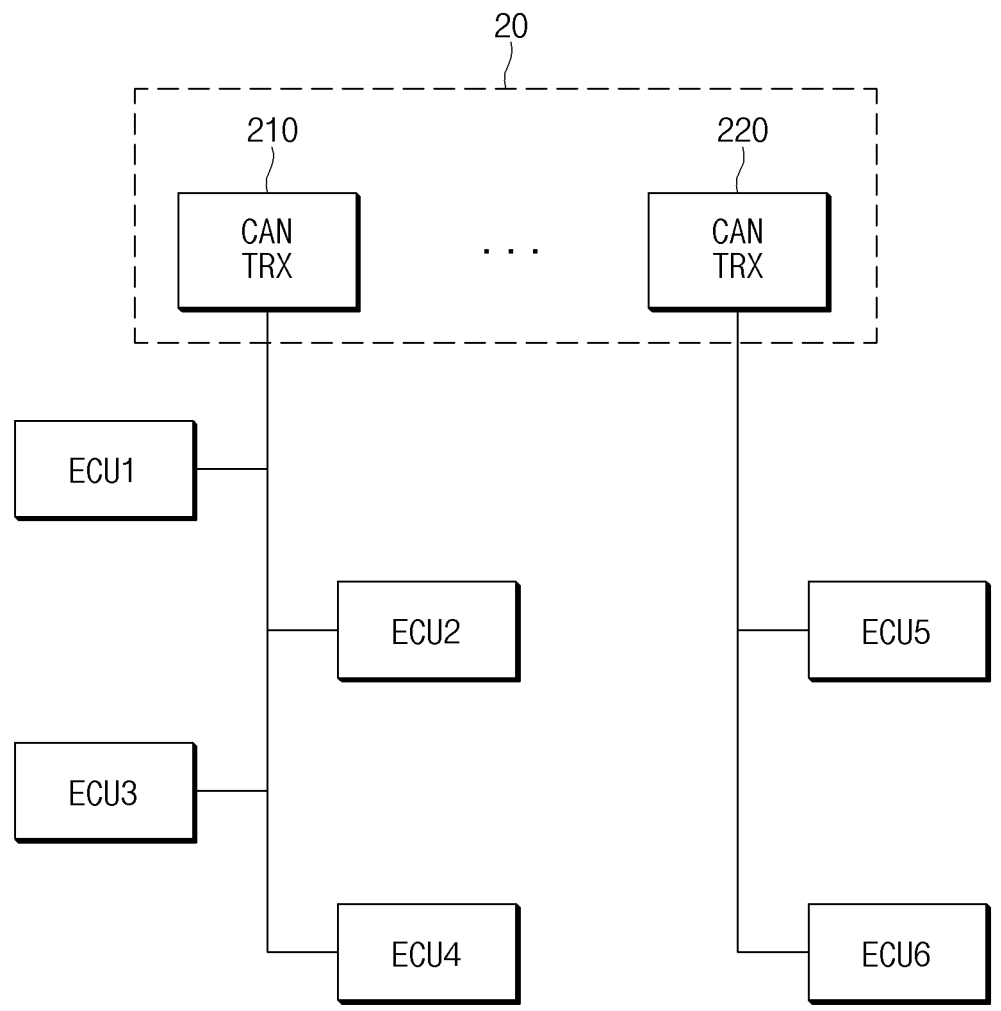
FIG. 2 is a view illustrating the detailed structure of a message receiving device in the apparatus for controlling the GCL of the Ethernet switch.

FIG. 2 is a view illustrating the detailed structure of the message receiving device provided in the GCL control apparatus 100 of the Ethernet switch.

As illustrated in FIG. 2, the message receiving device provided in the GCL control apparatus 100 of the Ethernet switch may include at least one CAN TRX (transceiver), and each CAN TRX may be electrically connected to a plurality of ECUS. Accordingly, the message receiving device 20 may receive the CAN message (or CAN data) from each ECU over the CAN.

For example, the first CAN TRX 210 may be connected to ECU1, ECU2, ECU3, and ECU4 through a first line bus, and the second CAN TRX 220 may be connected to ECU5, ECU6 through the second line bus.

The Ethernet switch 30, which may include a module to transmit the Ethernet frame to a specific port based on an Ethernet address, may open and close the transmission gate of each queue based on the GCL. For reference, the Ethernet switch 30 may have up to eight queues, and may also have a Time-Aware Shaper (TAS) for real-time traffic transmission.

Such a TAS may open or close the transmission gates of all switches in the network, based on a schedule (for example, GCL) produced in advance, such that the real time traffic is not delayed by other traffics. In this case, the detailed structure of the Ethernet switch 30 is illustrated in FIGS. 3 and 4.

Figure 3:
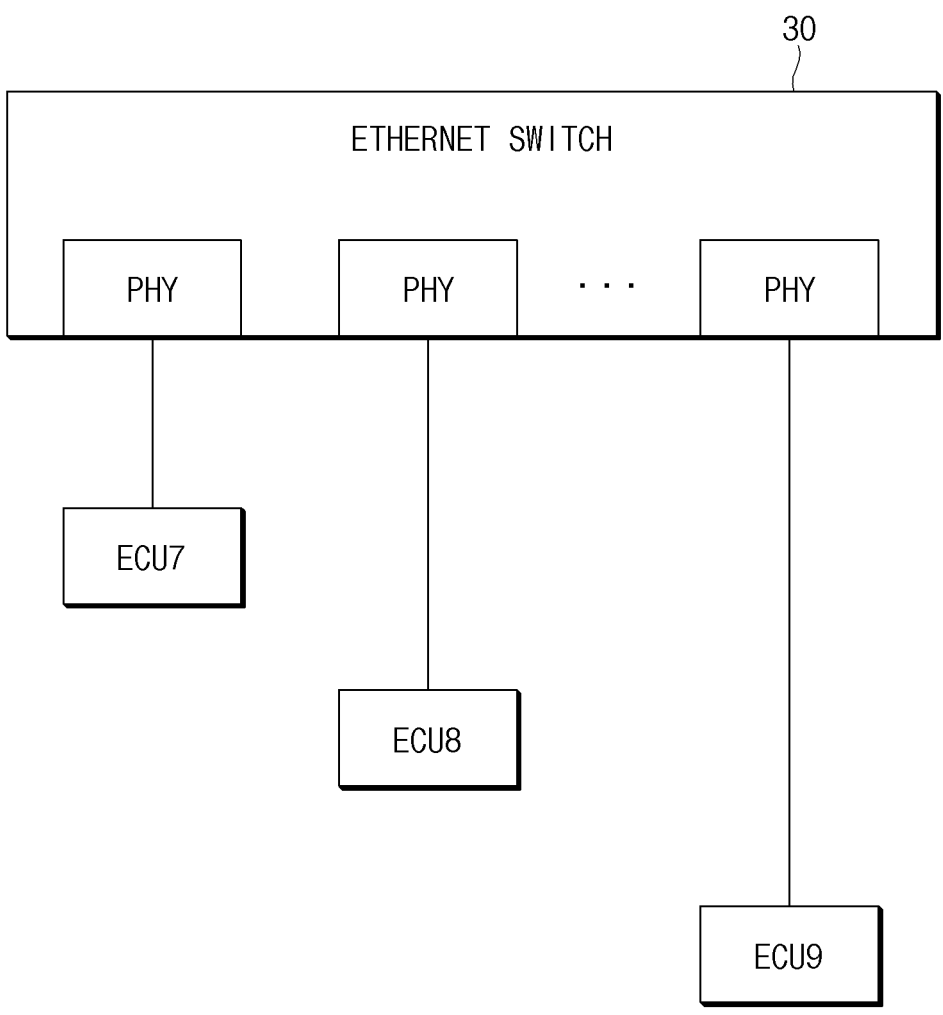
FIG. 3 is a view illustrating an external structure of the Ethernet switch provided in the apparatus for controlling the GCL of the Ethernet switch.

FIG. 3 is a view illustrating an external structure of the Ethernet switch provided in the apparatus for controlling the GCL of the Ethernet switch.

As illustrated in FIG. 3, the Ethernet switch 30 may include a plurality of physical layers (PHY). In this case, the physical layer is connected to a physical Ethernet communication medium (for example, ECU) to perform an Ethernet protocol communication function.

Figure 4:
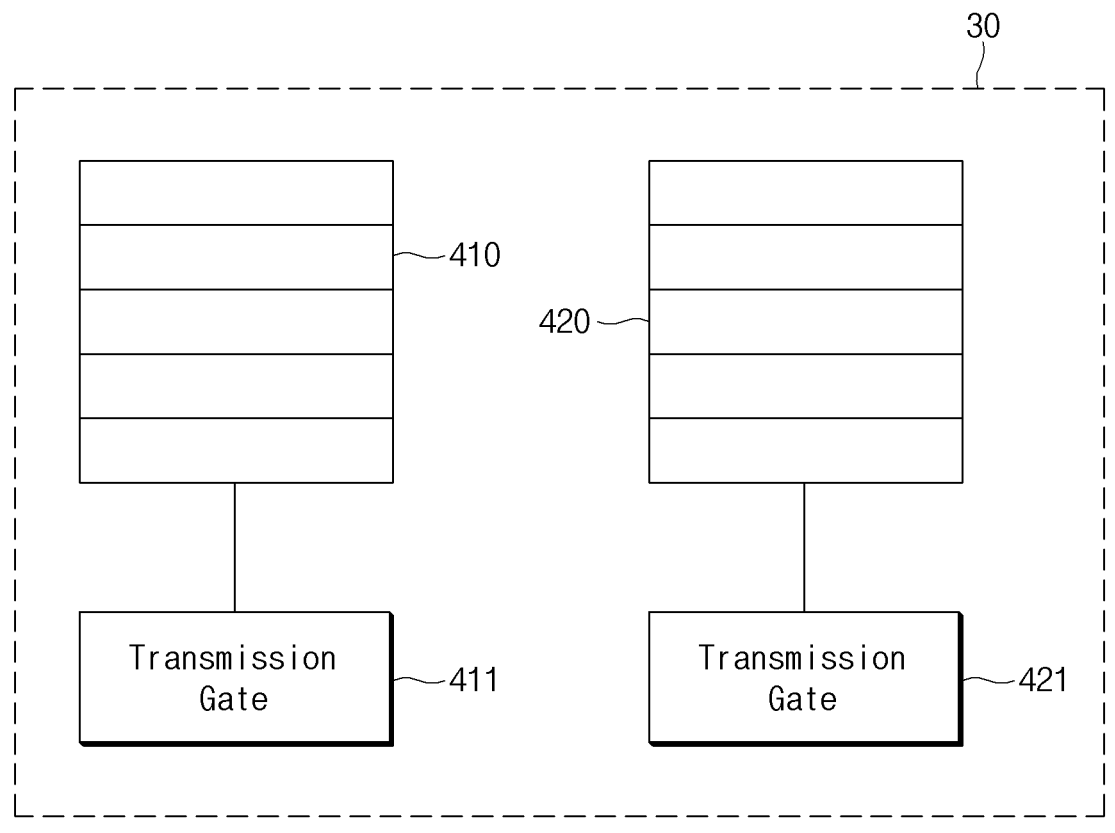
FIG. 4 is a view illustrating an internal structure of the Ethernet switch provided in the apparatus for controlling the GCL of the Ethernet switch.

FIG. 4 is a view illustrating an internal structure of the Ethernet switch provided in the apparatus for controlling the GCL of the Ethernet switch.

As illustrated in FIG. 4, the Ethernet switch 30 may include a first queue 410 to store an Ethernet frame corresponding to the CAN message aperiodically transmitted to the Ethernet and a second queue 420 to store the Ethernet frame corresponding to the CAN message periodically transmitted to the Ethernet. In this case, the first queue 410 may include a transmission gate 411, and the second queue 420 may include a transmission gate 421. Each of the first queue 410 and the second queue 420 may be implemented in the form of a single queue, but aspects of the present disclosure are not limited thereto (e.g., a plurality of queues may be used for each of the first queue 410 and the second queue 420). Accordingly, the TAS provided in the Ethernet switch 30 may open or close the transmission gate of each queue based on the GCL.

The controller 40 may perform the overall control such that the components normally perform the respective functions. The controller 40 may be implemented in the form of hardware or software, and may be implemented in the form of the combination of the hardware and the software. The controller 40 may be implemented with a micro-processor, but aspects of the present disclosure are not limited thereto.

The controller 40 may transform the CAN message to the Ethernet frame, determine a queue corresponding to the transmission type of the CAN message, and update the time to open or close the transmission gate of the queue over the GCL.

The storage 40 may store various logics, various algorithms, and various programs for the process of receiving a CAN message from an ECU over the CAN through the message receiving device 20, determining whether to route the CAN message to the Ethernet, based on a routing database (DB), of transmitting the CAN message to the Ethernet frame, when the CAN message is routed to the Ethernet, of determining queue corresponding to the transmission type of the CAN message, and of updating the time to open or close the transmission gate of the queue over the GCL. In this case, the transmission type may include aperiodic transmission and periodic transmission.

The controller 40 may receive a CAN message from an ECU over the CAN through the message receiving device 20, determine whether the CAN message is routed to the Ethernet, transform the CAN message to the Ethernet frame when the CAN message is routed to the Ethernet, divide a plurality of queues provided in the Ethernet switch 30 into a first queue (for example, a queue used to transmit a first Ethernet frame corresponding to the aperiodic CAN message) and a second queue (for example, a queue used to transmit a second Ethernet frame corresponding to the periodic CAN message), update the time to open or close the transmission gate of the first queue over the GCL, when the transmission type of the CAN message is an aperiodic transmission type, and update the time to open or close the transmission gate of the second queue over the GCL, when the transmission type of the CAN message is the periodic transmission type.

For example, when a 32-byte CAN message is transmitted in the period of 10 ms over the link of 100 Mbps, the transmission time of the CAN message is 2.56 μs (=32 bytes×8 bits/100 Mbps). Accordingly, the controller 40 may set the transmission gate of the second queue to open for 3 μs (=2.56 μs+margin) in the period of 10 ms over the GCL.

For example, when a 8-byte CAN message is transmitted in the period of 20 ms over the link of 100 Mbps, the transmission time of the CAN message is 0.64 μs (=8 bytes×8 bits/100 Mbps). Accordingly, the controller 40 may set the transmission gate of the second queue to open for 0.7 μs (=0.64 μs+margin) in the period of 20 ms over the GCL.

In another example, when a 32-byte aperiodic CAN message (for example, an event message) is transmitted over the link of 100 Mbps, the transmission time of the CAN message is 2.56 μs (=32 bytes×8 bits/100 Mbps). Accordingly, the controller 40 may set the transmission gate of the first queue to open for 3 μs (=2.56 μs+margin) over the GCL (e.g., for immediate transmission of the CAN message).

If the CAN message periodically received is not received any more, for example, when the CAN message is not received consecutively for 3 periods, the controller 40 may reset the time to open or close the transmission gate of the second queue corresponding to the CAN message over GCL.

For example, in the state that the time to open the transmission gate of the second queue for the CAN message is set to be open for 3 μs in the period of 10 ms, when the CAN message is not received consecutively for three periods, the controller 40 may reset the time to open or close the transmission gate of the second queue for the CAN message. In this case, the Ethernet switch 30 may not perform the operation of opening or closing the transmission gate of the second queue for 3 μs in the period of 10 ms, with respect to the CAN message.

The controller 40 may perform time synchronization between ECUs over the CAN having a bus-type topology and connected to the message receiving device 20 through a bus line, and ECUs over the Ethernet connected to the Ethernet switch 30 to transmit or receive data in a peer-to-peer type The controller 400 may aggregate a plurality of CAN messages having the same period and transform the CAN messages into the form of one frame (or the Ethernet data), and may transmit the one Ethernet frame to the Ethernet. In this case, the number of Ethernet frames may be reduced, thereby increasing traffic efficiency.

For example, the controller 40 may obtain (e.g., receive) a CAN message including at least one CAN signal by decapsulating the CAN frame received from the CAN, determine a starting bit for each of at least one CAN signal included in the CAN message, generate the CAN signal and an Ethernet signal incorporating a starting bit corresponding to the CAN signal into mutually different fields, capsulate the Ethernet signal, and generate the Ethernet frame.

Figure 5:
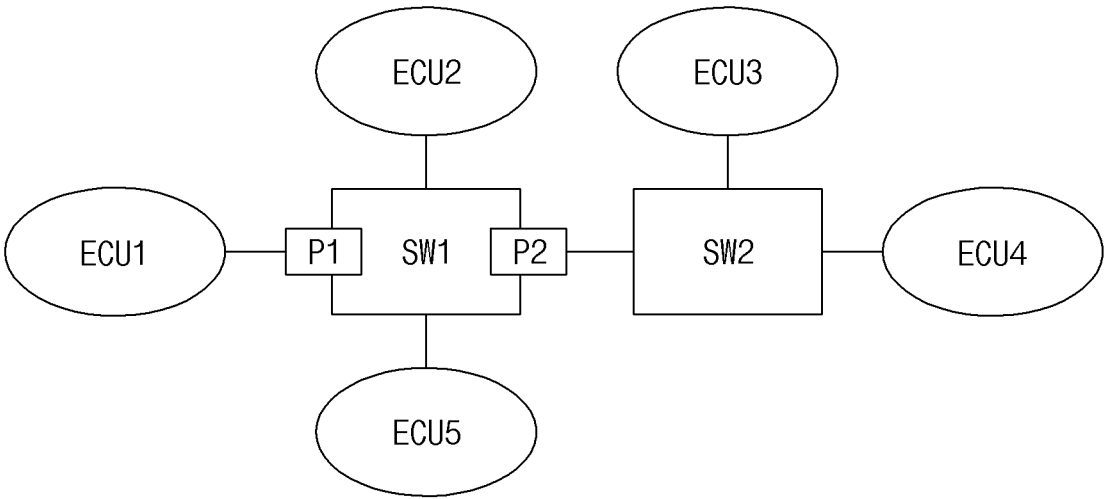
FIG. 5 is a view illustrating a vehicle network environment to which the apparatus for controlling the GCL of the Ethernet switch is applied.

The controller 40 may generate the GCL as illustrated in FIG. 6, under a vehicle network environment illustrated in FIG. 5.

FIG. 5 is a view illustrating a vehicle network environment to which the GCL control apparatus of the Ethernet switch is applied.

As illustrated in FIG. 5, the vehicle network may include a first Ethernet switch SW1 including a first port P1 and a second port P2, a second Ethernet switch SW2 connected to the second port, ECU1, ECU2, and ECU5 connected to the first Ethernet switch SW1, and ECU3 and ECU4 connected to the second Ethernet switch SW2. In this case, the number of ECUs does not exert any influence on the present disclosure.

FIG. 6 is a view illustrating a GCL generated by the apparatus for controlling the GCL of the Ethernet switch.

As illustrated in FIG. 6, the GCL generated by the GCL control apparatus of the Ethernet switch may include a source, a destination, a priority, a size, and a period with respect to each scheduled traffic.

For example, ST1 having the size of 125 Bytes is a message transmitted from ECU1 to ECU3 in the period of 50 ms, and has the priority of '6'. ST2 having the size of 250 Bytes is a message transmitted from ECU1 to ECU4 in the period of 100 ms, and has the priority of '4'. ST3 having the size of 125 Bytes is a message transmitted from ECU2 to ECU3 in the period of 100 ms, and has the priority of '7'. ST4 having the size of 250 Bytes is a message transmitted from ECU2 to ECU1 in the period of 100 ms, and has the priority of '4'. ST5 having the size of 250 Bytes is a message transmitted from ECU5 to ECU1 in the period of 50 ms, and has the priority of '5'. In this case, the priority is higher, as the numeric value is high. In some implementations, if the numeric value is lower, the priority may be higher.

As illustrated in FIG. 6, the TAS of the first Ethernet switch SW1 may transmit ST1, ST2, ST3, ST4, and ST5 to a destination, based on the GCL. This is illustrated as in FIG. 7.

Figure 7:
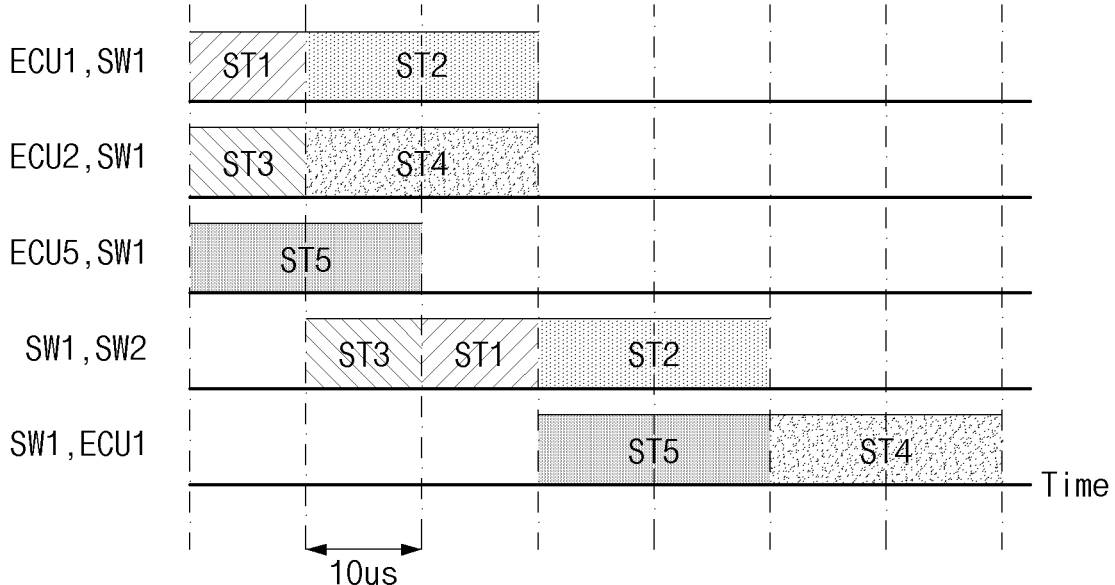
FIG. 7 is a view illustrating the procedure in which a first Ethernet switch SW1 transmits a message, based on GCL.

FIG. 7 is a view illustrating the process of transmitting a message by the first Ethernet switch SW1 based on GCL.

As illustrated in FIG. 7, ECU1 first transmits ST1 to SW1, and transmits ST2 later. This is because ST1 has priority higher than ST2. ECU2 first transmits ST3 to SW1, and transmits ST4 later. This is because ST3 has priority higher than ST4. ECU5 transmits ST5 to SW1.

SW1 detects that a message to be transmitted to SW2 is ST1, ST2, or ST3, through the second port P2, and transmits messages in order of ST3, ST1, and ST2, based on the priority of ST1, the priority of ST2, and the priority of ST3. Thereafter, ST1 is repeatedly transmitted in period of 50 ms, and ST3 and ST2 are periodically and repeatedly transmitted.

SW1 detects that messages to be transmitted to ECU1 through the first port P1 are ST4 and ST5, and transmits the messages in the order of ST5 and ST4 based on the priority of ST4 and the priority of ST5. Thereafter, ST5 is repeatedly transmitted in period of 50 ms, and ST4 is repeatedly transmitted in period of 100 ms.

Figure 8:
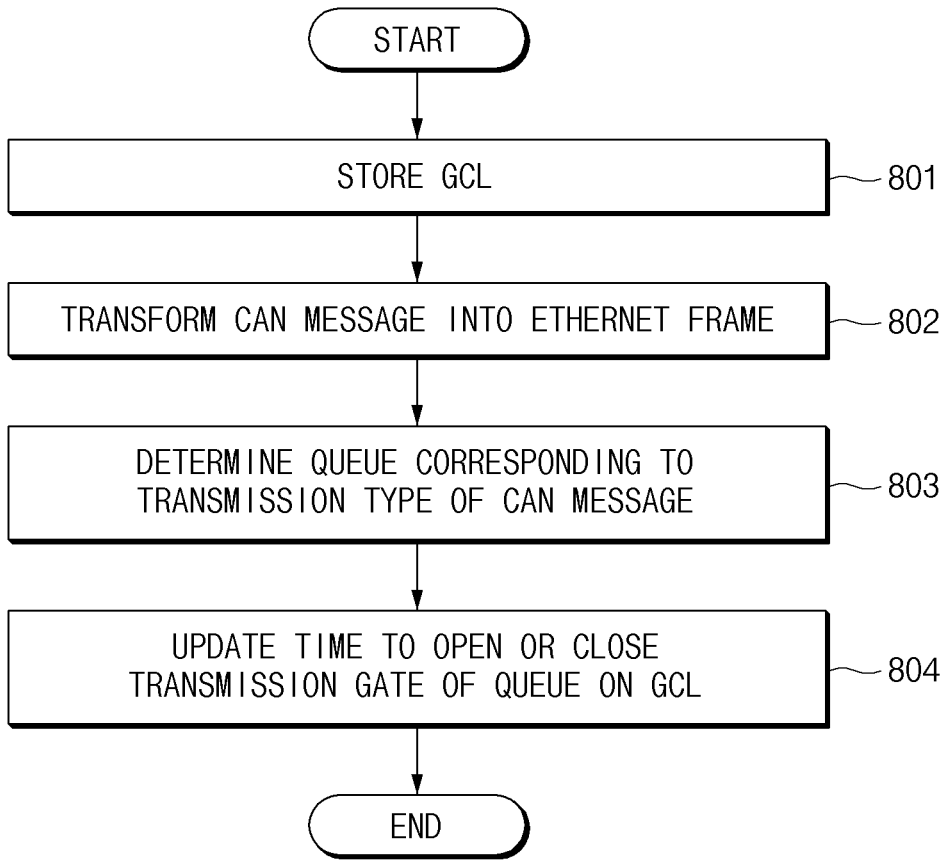
FIG. 8 is a flowchart illustrating a method for controlling a GCL of an Ethernet switch.

FIG. 8 is a flowchart illustrating a method for controlling a GCL of an Ethernet switch;

The storage 10 may store a gate control list (GCL) (801).

The controller 40 may transform a controller area network (CAN) message to an Ethernet frame (802).

The controller 40 may determine a queue corresponding to the transmission type of the CAN message (803).

The controller 40 may update, in the GCL, the time to open or close the transmission gate of the queue (804).

According to an aspect of the present disclosure, an apparatus for controlling a gate control list (GCL) of an Ethernet switch, may include a storage to store the GCL, and a controller configured to transform a controller area network (CAN) message to an Ethernet frame, determine a queue corresponding to a transmission type of the CAN message, and update a time to open or close a transmission gate of the queue on the GCL.

The queue may include a first queue used to transmit a first Ethernet frame corresponding to an aperiodic CAN message, and a second queue used to transmit a second Ethernet frame corresponding to a periodic CAN message.

The controller may update the time to open or close the transmission gate of the first queue on the GCL, when the transmission type of the CAN message is an aperiodic transmission type, and update a time to open or close a transmission gate of the second queue on the GCL, when the transmission type of the CAN message is a periodic transmission type.

The controller may reset the time to open or close the transmission gate of the second queue corresponding to the CAN message having the periodic transmission type, on the GCL., when the CAN message having the periodic transmission type is not consecutively received at the preset number of times or more The controller may perform time-synchronization between a CAN and an Ethernet.

The controller may transform a plurality of CAN messages having the same period into one Ethernet frame.

The controller may update the GCL such that a CAN message, which has higher priority, of a plurality of CAN messages having the same period is first transmitted.

The controller may determine whether the CAN message is routed through an Ethernet.

The apparatus may further include a receiving device configured to receive the CAN message from an electronic control unit (ECU) on the CAN.

The Ethernet switch may transmit the Ethernet frame based on the GCL.

Another aspect of the present disclosure, a method for controlling a gate control list (GCL) of an Ethernet switch, may include storing, by a storage, a gate control unit (GCL), transforming, by a controller, a controller area network (CAN) message into an Ethernet frame, determining, by the controller, a queue corresponding to a transmission type of the CAN message, and updating, by the controller, a time to open or close a transmission gate of the queue on the GCL.

The updating may include updating, by the controller, a time to open or close a transmission gate of the first queue on the GCL, when the transmission type of the CAN message is an aperiodic transmission type, and updating, by the controller, a time to open or close a transmission gate of the second queue on the GCL, when the transmission type of the CAN message is a periodic transmission type.

The updating includes resetting, by the controller, the time to open or close the transmission gate of the second queue corresponding to the CAN message having the periodic transmission type, on the GCL., when the CAN message having the periodic transmission type is not consecutively received at the preset number of times or more The method may further include e performing, by the controller, time-synchronization between a CAN and an Ethernet, before the transforming is performed.

The transforming may include transforming a plurality of CAN messages having the same period into one Ethernet frame.

The updating may further include updating, by the controller, the GCL such that a CAN message, which has higher priority, of a plurality of CAN messages having the same period is first transmitted.

The method may further include determining, by the controller, whether to route the CAN message to an Ethernet, before the transforming is performed.

The method may further include receiving, by a receiving device, the CAN message from an electronic control unit (ECU) on the CAN, before the transforming is performed.

The method may further include transmitting, by the Ethernet switch, the Ethernet frame based on the GCL, after the updating is performed.

Figure 9:
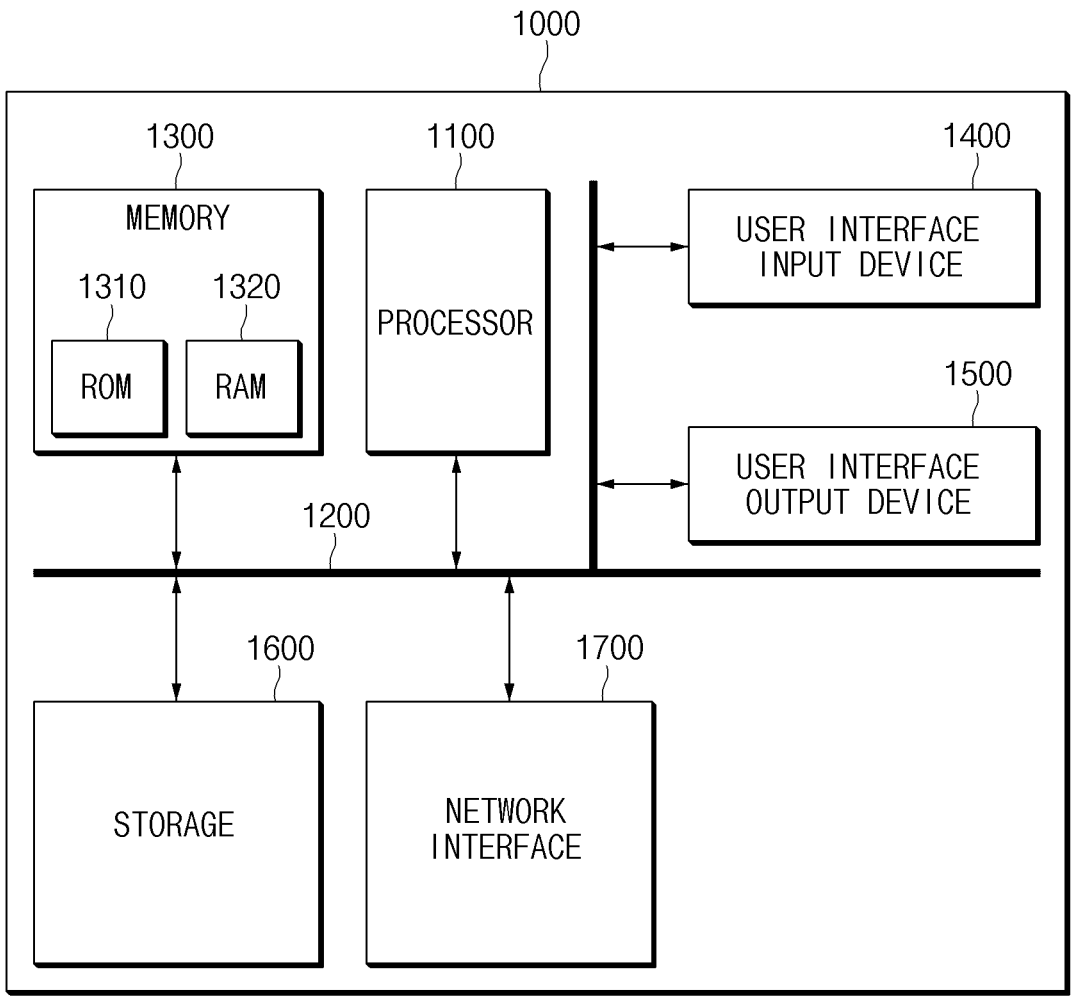
FIG. 9 is a block diagram illustrating a computing system to execute a method for controlling a GCL of an Ethernet switch.

FIG. 9 is a block diagram illustrating a computing system to execute a method for controlling a GCL of an Ethernet switch.

Referring to FIG. 9, the method for controlling a GCL of the Ethernet switch may be implemented through a computing system 1000. A computing system 1000 may include at least one processor 1100, a memory 1300, a user interface input device 1400, a user interface output device 1500, a storage 1600, and a network interface 1700, which may be connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the features disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively or additionally, the storage medium may be integrated with the processor 1100. The processor 1100 and storage medium may reside in an application specific integrated circuit (ASIC). The ASIC may reside in a user terminal. Alternatively, the processor 1100 and the storage medium may reside as separate components of the terminal of the user.

As described above, in the apparatus for controlling the GCL of the Ethernet switch, and the method thereof, the controller area network (CAN) message may be transformed to an Ethernet frame, a queue corresponding to a transmission type of the CAN message may be determined, and the time to open or close the transmission gate of the queue over a gate control list (GCL) may be updated, thereby effectively scheduling (lowering the complexity of scheduling) a plurality of CAN messages transmitted to the Ethernet, and improving transmission reliability of the CAN message.

The above description provides an example of the technical idea of the present disclosure, and various modifications and modifications may be made by one skilled in the art without departing from the essential characteristic of the present disclosure. Therefore, various examples of the present disclosure are provided to explain the spirit and scope of the present disclosure, but not to limit them, so that the spirit and scope of the present disclosure is not limited by the illustrated example features. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiment(s) and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
a storage configured to store a gate control list (GCL) associated with an Ethernet switch; and
a controller configured to:
transform a controller area network (CAN) message to an Ethernet frame;
determine a queue corresponding to a transmission type of the CAN message, wherein the queue comprises:
a first queue configured to transmit a first Ethernet frame corresponding to an aperiodic CAN message; and
a second queue configured to transmit a second Ethernet frame corresponding to a periodic CAN message; and
update, in the GCL, a time to open or close a transmission gate of the queue by:
based on the transmission type of the CAN message being an aperiodic transmission type, updating, in the GCL, a time to open or close a transmission gate of the first queue; or
based on the transmission type of the CAN message being a periodic transmission type, updating, in the GCL, a time to open or close a transmission gate of the second queue.

2. The apparatus of claim 1, wherein the controller is configured to:
based on a quantity of consecutive reception failures of the CAN message having the periodic transmission type being greater than a configured threshold value, reset, in the GCL, the time to open or close the transmission gate of the second queue.

3. The apparatus of claim 1, wherein the controller is configured to:
perform time-synchronization between a CAN and an Ethernet.

4. The apparatus of claim 1, wherein the controller is configured to:
transform a plurality of CAN messages having a same period to one Ethernet frame.

5. The apparatus of claim 1, wherein the controller is configured to:
based on a first CAN message of a plurality of CAN messages for a same Ethernet frame having a higher priority than a second CAN message of the plurality of CAN messages, update the GCL such that the first CAN message is transmitted prior to transmission of the second CAN message.

6. The apparatus of claim 1, wherein the controller is configured to:
determine whether to route the CAN message through an Ethernet.

7. The apparatus of claim 1, further comprising:
a receiving device configured to receive the CAN message from an electronic control unit (ECU) associated with a CAN.

8. The apparatus of claim 1, wherein the Ethernet switch is configured to:
transmit, based on the GCL, the Ethernet frame.

9. A method comprising:
storing, in a storage, a gate control list (GCL) associated with an Ethernet switch;
transforming, by a controller, a controller area network (CAN) message to an Ethernet frame;
determining, by the controller, a queue corresponding to a transmission type of the CAN message, wherein the queue comprises:

a first queue configured to transmit a first Ethernet frame corresponding to an aperiodic CAN message; and a second queue configured to transmit a second Ethernet frame corresponding to a periodic CAN message; and updating, by the controller and in the GCL, a time to open or close a transmission gate of the queue, wherein the updating comprises:

based on the transmission type of the CAN message being an aperiodic transmission type, updating, in the GCL, a time to open or close a transmission gate of the first queue; or based on the transmission type of the CAN message being a periodic transmission type, updating, in the GCL, a time to open or close a transmission gate of the second queue.

10. The method of claim 9, wherein the updating comprises:

based on a quantity of consecutive reception failures of the CAN message having the periodic transmission type being greater than a configured threshold value, resetting, in the GCL, the time to open or close the transmission gate of the second queue.

11. The method of claim 9, further comprising:

prior to the transforming, performing, by the controller, time-synchronization between a CAN and an Ethernet.

12. The method of claim 9, wherein the transforming comprises:

transforming a plurality of CAN messages having a same period to one Ethernet frame.

13. The method of claim 9, wherein the updating comprises:

based on a first CAN message of a plurality of CAN messages for a same Ethernet frame having a higher priority than a second CAN message of the plurality of CAN messages, updating, by the controller, the GCL such that the first CAN message is transmitted prior to transmission of the second CAN message.

14. The method of claim 9, further comprising:

prior to the transforming, determining, by the controller, whether to route the CAN message to an Ethernet.

15. The method of claim 9, further comprising:

prior to the transforming, receiving, by a receiving device, the CAN message from an electronic control unit (ECU) associated with a CAN.

16. The method of claim 9, further comprising:

after the updating, transmitting, by the Ethernet switch and based on the GCL, the Ethernet frame.

17. An apparatus comprising:

a storage configured to store a gate control list (GCL) associated with an Ethernet switch;

a memory storing at least one instruction; and a processor configured to execute the at least one instruction to cause the apparatus to:

transform a controller area network (CAN) message to an Ethernet frame;

determine a queue corresponding to a transmission type of the CAN message;

update, in the GCL, a time to open or close a transmission gate of the queue; and based on a first CAN message of a plurality of CAN messages for a same Ethernet frame having a higher priority than a second CAN message of the plurality of CAN messages, update the GCL such that the first CAN message is transmitted prior to transmission of the second CAN message.

18. The apparatus of claim 17, wherein the processor is configured to execute the at least one instruction to cause the apparatus to update the time to open or close the transmission gate of the queue by:

based on the transmission type of the CAN message being an aperiodic transmission type, updating, in the GCL, a time to open or close a transmission gate of a first queue associated with the aperiodic transmission type; or based on the transmission type of the CAN message being a periodic transmission type, updating, in the GCL, a time to open or close a transmission gate of a second queue associated with the periodic transmission type.

19. The apparatus of claim 18, wherein the processor is configured to execute the at least one instruction to cause the apparatus to:

based on a quantity of consecutive reception failures of the CAN message having the periodic transmission type being greater than a configured threshold value, reset, in the GCL, the time to open or close the transmission gate of the second queue.

20. The apparatus of claim 18, wherein the first queue is configured to transmit a first Ethernet frame corresponding to an aperiodic CAN message; and wherein the second queue is configured to transmit a second Ethernet frame corresponding to a periodic CAN message.

* * * * *